July 5, 1927.

S. J. BENS 1,634,643

INTERLOCKING LINK

Original Filed Feb. 7, 1924

Inventor:

Samuel J. Bens, by Spear, Middleton Donaldson & Hall
Attys.

Patented July 5, 1927.

1,634,643

UNITED STATES PATENT OFFICE.

SAMUEL J. BENS, OF NEW YORK, N. Y.

INTERLOCKING LINK.

Application filed February 7, 1924, Serial No. 691,249. Renewed November 16, 1926.

This invention relates to a belt or chain which is composed of individual links, and is concerned particularly with a manner of securing adjacent links together in a pivotal manner.

A further object of the invention consists in providing such means whereby the direct pull on the chain through the power means is taken by the links themselves.

Still another object is the provision of such means as above, which will also receive the wear caused by partial rotation of adjacent links in regard to each other.

To this end the invention consists in providing individual links which have apertures at their ends and a struck-up and under-cut portion adjacent the apertures. By thus reversing adjacent links so that the struck-up portion in one link extends upwardly and the similar portion in the overlapping link projects downwardly, as through the aperture in the other, the links will be held together in an efficient manner, and also in a manner which will not only receive all of the wear caused by partial rotation of the links in regard to each other, but also will receive the full pulling force of applied power.

It will be found desirable in some instances, to pass a soft rivet through the reversed apertures in overlapping links to assist in preventing accidental displacement of the links.

The invention further consists in the combination, arrangement and construction of parts herein shown and described.

I have illustrated in the accompanying drawings, a preferred form, although it is to be understood that this is to be taken in an illustrative sense only, and does not limit the scope of the invention.

In these drawings:—

Fig. 3 is a sectional view along the line 3—3 of Fig. 1.

Figs. 4 and 5 are details of the link elements.

Figure 1:
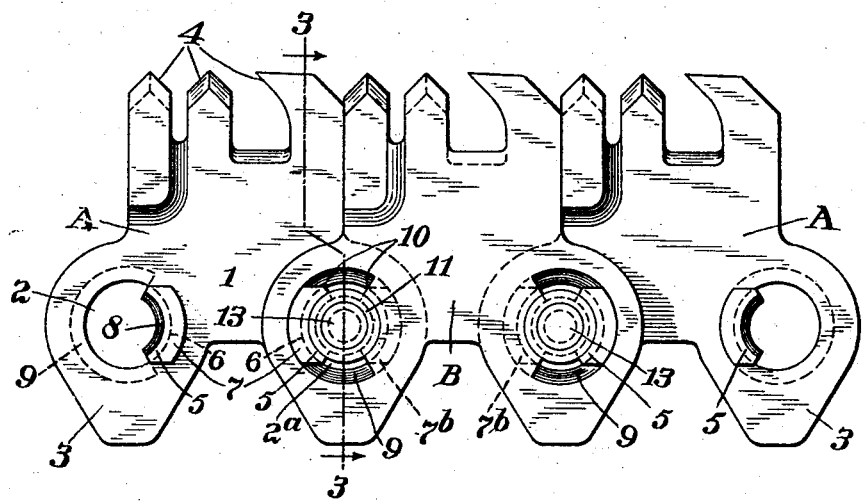
Figure 1 is a plan view of one embodiment of my invention.
Figure 2:
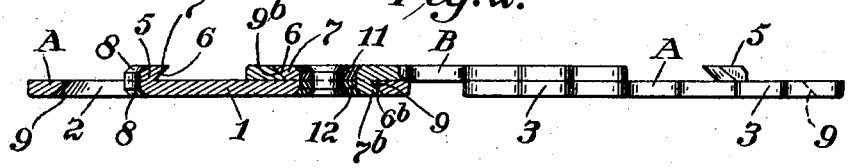
Fig. 2 is an edge elevation, partly in section.
Figure 2:
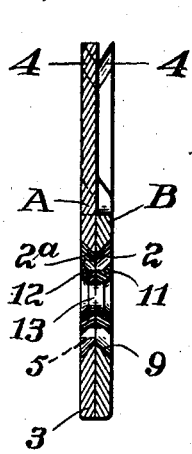
Figure 2:
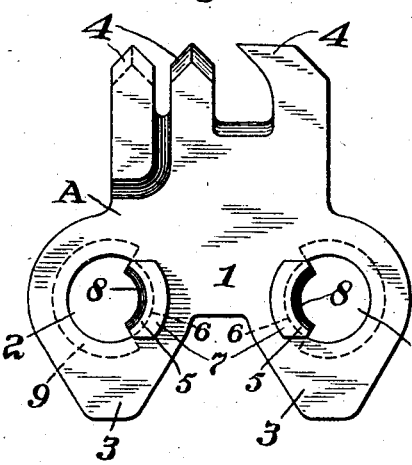
Figure 2:
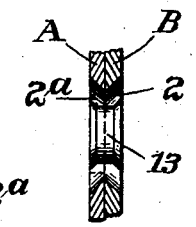

A link A is shown to consist of a plate 1 having apertures 2 and $2^a$ near its ends and to one side of the longitudinal center of the link. Adjacent the apertures there is a tooth or irregularity 3 of such a nature that this side of the link will conform to the contour of a sprocket over which the belt or chain may pass in order that power may be applied. This sprocket is not illustrated as it forms no part of the invention and may be of any suitable construction.

A link of this character is particularly adapted for use with chain saws, and I have, therefore, shown that edge of the link opposite the sprocket engaging portion, as having teeth 4, the extent of which is equal to the distance between aperture centers in an individual link, the outer edge of the teeth being in line with said centers. It is noted however, that the same principle can also be used advantageously with any type of link belt or chain where power is to be transmitted from one point to another, and therefore, the invention contemplates a greater scope than chain saws alone.

The link A has a part 5 struck up from the aperture and turned back upon itself, under-cut as at 6 to form a hook-shaped projection 7. It is clearly shown that a portion of part 7 projects into the imaginary circle defined by the aperture. The projection 7 is beveled as at 8, for a purpose which will be more fully described hereinafter, likewise the remaining portion of the aperture, as at 9.

Similarly, link B is provided with a hook-shaped projection $7^b$ made in the same manner.

In assembling, it is only necessary to reverse the links A and B so that the projections 7 and $7^b$ extend in opposite directions through the reversed apertures in the overlapped links. Such an arrangement enables the beveled part $9^b$ adjacent the aperture in link B to engage the under-cut portion 6 of the projection 7 in the link A. At the same time, the beveled portion 9 adjacent the aperture in the link A engages the under-cut portion $6^b$ of the projection $7^b$ on the link B.

It will be readily seen that the extent of the projections 7 and $7^b$ is less than one-half of the circumference of the aperture between the extremities of the projections 7 and $7^b$, so that the two links may have rotary movement relative to each other to the extent of twice the length of the arc 10.

In order that the links may be fastened together independently of the above mentioned lock, it has been found desirable to apply a ring composed of the parts 11 and 12 to the aperture in a link, within which may be placed a rivet 13, as is clearly shown. The object of the parts 11 and 12 is simply to prevent the rivet from mushrooming into the space 10, as if this occurred, relative rotation between links A and B would be interfered with. If, however, sufficient care is exercised in the heading or deformation of the rivet 13, the rings 11 and 12 may be dispensed with.

It will be obvious that a plurality of links A and B may be used in order to produce a chain of any desired length.

While I have shown specifically the projections 7 and 7$^b$ as having under-cut portions and the edge of the apertures beveled as at 9 and 9$^b$, it is quite clear that efficient results could be secured by not having these parts under-cut, but having them abut each other in a plane substantially perpendicular to the plane of the link. In this instance, however, the rivet would be the sole means of securing the links together.

It will be apparent, however, that the projections 7 and 7$^b$, together with the edges 9 and 9$^b$ of the apertures, receive the entire wear caused by partial rotation between adjacent links, as well as the full driving strain on the belt.

Having thus described my invention, what I claim is:—

1. A chain or link belt including individual links having overlapping ends, an aperture in the end of each link, each link having an undercut projection extending within the aperture of the overlapping link and in interlocking engagement with the wall of said aperture.

2. A chain or link belt including individual links having overlapping ends, an aperture in the end of each link, a portion of each link forming the aperture wall being beveled, the overlapping link having a portion reversely beveled and engaging the beveled aperture wall of the first mentioned link.

3. A chain saw including individual links having overlapping ends, an aperture in the end of each link, each link having an undercut projection thereon extending within the aperture of the overlapping link, and engaging an undercut portion of the aperture wall.

4. A chain saw including links, each link having an aperture therein, a part of the aperture wall being beveled, another part of the wall having a built up projection thereon, said projection being undercut, said undercut portion engaging the beveled aperture wall of the adjacent link.

5. A chain saw including individual links having overlapping ends, each link having an aperture therein having a part of the wall beveled, and an undercut projection adjacent said aperture, the undercut projection of each link extending within the aperture of its overlapping neighbor, and underlying the bevel of its aperture wall.

In testimony whereof, I affix my signature.

SAMUEL J. BENS.